(No Model.) 2 Sheets—Sheet 1.
A. H. TYLER & J. S. E. DE VESIAN.
MACHINE FOR DRILLING, BORING, OR SHAPING.
No. 452,169. Patented May 12, 1891.
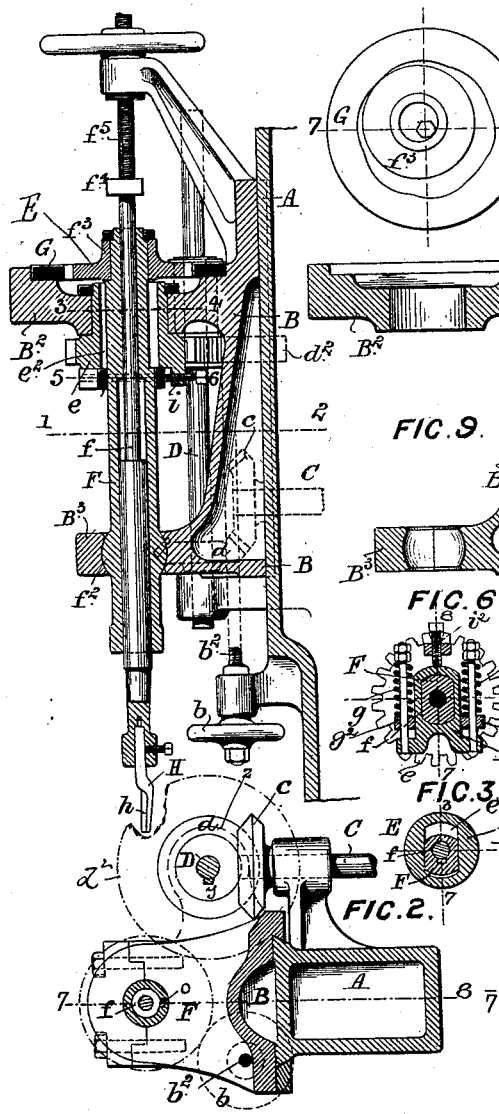
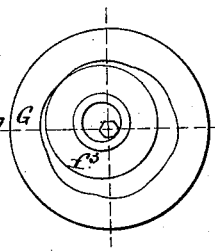
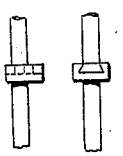
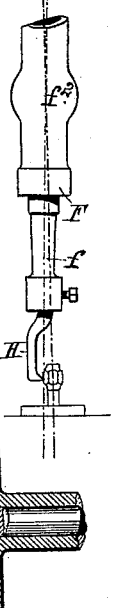
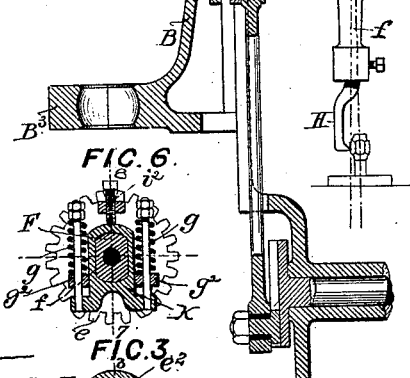
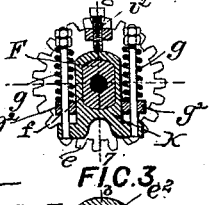
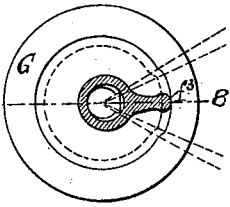
Witnesses
John Revell
George Bauman
Inventors
Alfred H. Tyler
John Stuart Ellis de Vesian
By their Attys.
Howson and Howson (No Model.) 2 Sheets—Sheet 2.

A. H. TYLER & J. S. E. DE VESIAN.
MACHINE FOR DRILLING, BORING, OR SHAPING.

No. 452,169. Patented May 12, 1891.

Witnesses
John Revell
George Baumann

Inventors
Alfred H. Tyler and
John Stuart Ellis de Vesian
By their Attorneys
Howson and Howson

UNITED STATES PATENT OFFICE.

ALFRED HUGH TYLER AND JOHN STUART ELLIS DE VESIAN, OF LONDON, ENGLAND.

MACHINE FOR DRILLING, BORING, OR SHAPING.

SPECIFICATION forming part of Letters Patent No. 452,169, dated May 12, 1891.

Application filed May 19, 1890. Serial No. 352,381. (No model.) Patented in England March 11, 1890, No. 3,850.

*To all whom it may concern:*

Be it known that we, ALFRED HUGH TYLER and JOHN STUART ELLIS DE VESIAN, engineers, subjects of the Queen of Great Britain and Ireland, and both of the firm of Tyler & Ellis, of 5 Crown Court, in the city of London, England, have invented certain Improvements in Machines for Drilling, Boring, or Shaping, of which the following is a specification.

Our invention has for its object to provide a machine by means of which holes of any shape or size can be bored or drilled or by which the exteriors of nuts can be shaped or trued or other analogous operations performed.

According to our invention we provide a tool-carrying spindle capable of being moved longitudinally in its carrier or sleeve, which sleeve, by being mounted on a universal joint or the like and in a slide, is capable of a vibratory movement. At a point either above or below the center of oscillation the said sleeve is provided with a roller, (or equivalent bearing surface,) and this roller is, by means of a system of springs to be hereinafter described, made to traverse the surface of a templet shaped according to the hole to be drilled or the surface to be machined and fixed rigidly to the carriage or head-stock which carries the whole of the above-described apparatus. This carriage or head-stock, with the drill-spindle and templet, is capable of being moved vertically in slides while drilling, the slides being attached to the main framing of the machine, so that the tool is fed to or from its work, or the work may be fed relatively to the tool.

Figure 1 is a vertical section through the center of the drill-spindle, (on line 7 8 of Fig. 2), showing so much of the apparatus as is necessary to illustrate our invention. Fig. 2 is a sectional plan, the section being taken on the line 1 2, Fig. 1. Fig. 3 is a section taken on the line 3 4, Fig. 1. Figs. 4 and 5 show the loose slide connection between the upper and lower portions of the cutter-holder. Fig. 6 is a section on the line 5 6, Fig. 1. Fig. 7 shows in plan a roller and templet suitable for forming a hexagon, as there diagrammatically indicated. Fig. 8 shows arrangement of tool for finishing outsides of objects. Fig. 9 shows means for imparting a reciprocating movement to the head which carries the cutter-holder. Fig. 10 shows arm attached to spindle in place of a roller for the templet to act upon for forming keyways. Fig. 11 shows an arrangement for using an outside templet. Fig. 12 shows the machine designed with the spherical bearing above and the templet below. Fig. 13 shows an arrangement by means of which the spherical bearing is entirely dispensed with, but the same result obtained by using two templets, both of similar shape, but one smaller than the other. Fig. 14 is a sectional detail view showing part of the driving mechanism.

A is the main framing of the machine, having guides upon which the tool-carrying head B can be moved to and from the work by the hand-wheel $b$ and screw $b^2$.

C is the driving-shaft for transmitting rotary motion to the tool, it being provided with a bevel-pinion C′, gearing with a pinion $d$, secured to the shaft D. On this shaft slides a spur-wheel $d^2$, provided in its boss with a square feather or key fitting in a square slot which runs the whole length of the shaft D, so that, although the spur-wheel $d^2$ can slide on the shaft D, the one cannot rotate without the other. This spur-wheel $d^2$ is caused to move vertically up and down the shaft D with the head-stock B, as shown more particularly in Fig. 14, which is a vertical section taken through the axis of the shaft D, by means of the sleeve and collar $y$ passing through the boss $z$, which is cast on the head-stock B, so that in whatever position the head-stock B is relatively to the driving-shaft C the drill receives its rotary motion from the shaft D by means of the sliding wheel $d^2$, which engages with the spur-wheel $e$, secured to or formed in one with the sleeve E. This sleeve rotates in the bearing in the upper projecting part $B^2$ of the head-stock B.

The means by which the sleeve F, carrying the drill-spindle $f$, is oscillated, while at the same time it is being driven round, is clearly shown by Fig. 3, which is a section on the line 3 4, Fig. 1. There it will be seen that the sleeve E on the driving-wheel $e$ has a hole through it with parallel sides. In this hole slides the sleeve F, which at this point also has parallel sides exactly fitting the hole in the sleeve E in one direction, while in the other direction there is room for the sleeve to oscillate. The result of this arrangement is that if the sleeve E is rotated the drill-sleeve F must revolve with it, on account of the parallel sides, while if any other force be exerted on the drill-sleeve (such as that due to the templet) the clearance $e^2$ permits of its free oscillation, and the combination of these two motions enables the drill to move in any desired direction for forming any-shaped hole. The drill-spindle is driven from the sleeve F by means of a feather $o$, Fig. 2, on the spindle fitting freely a slot in the sleeve, so that the drill-spindle can be moved up and down in the sleeve F and yet must revolve with it. The lower part of this sleeve F is furnished with a spherical bearing $f^2$, fitting into a similar seating in the lower branch $B^3$ of the head-stock B, and it is on this spherical seat that the drill revolves and oscillates.

The guiding of the drill to cut the required shape is performed as follows: A templet G (the shape of which varies according to the shape of the piece of material to be machined) is inserted in the recess provided for it in the upper branch $B^2$ of the head-stock B, and the roller $f^3$, Fig. 7, which runs freely on the end of the sleeve F to guide the spindle $f$ and the tool, is kept against the templet by the collar $p$, in the manner shown, and is caused to run over the surface of this templet G, with which it is held in contact by the arrangement of springs $g$ and saddle $k$, as shown at Fig. 6, which is a section on the line 5 6, Fig. 1. The spindle-sleeve F is embraced by the saddle-piece $k$, provided with the two bolts, as shown. These bolts each pass through a lug $g^2$, cast on the lower side of the driving-wheel $e$. Over each of these bolts is placed a spiral spring $g$, kept in their place and in a state of compression by the double nuts, as shown. It will be seen that as these springs are constantly tending to extend they press equally on the lug $g^2$ at one end and on the under side of the nuts at the other end. As the lugs form part of the spur-wheel $e$, Fig. 6, (which can only revolve,) the pressure of the springs on the bolts which are attached to the saddle $k$ will constantly tend to press the said saddle, together with the sleeve F, as far over as possible to one side, and thus it is that the roller $f^3$, attached to the sleeve F, is always kept in contact with the templet G. The screw $i$, which passes through a lug $i^2$, cast on the spur-wheel $e$, is for the purpose of pressing the roller $f^3$ or the like out of contact with the templet G when desired.

The means by which the drill-spindle is moved longitudinally in its sleeve F is shown in Figs. 4 and 5. The screw $f^5$ has a small dovetailed piece forged onto the end of it, which fits loosely into a dovetailed slot $f^4$, formed on the end of the spindle $f$. The swinging motion is so small here that this looseness is found to be sufficient to prevent the joint binding when the drill is at work, while by revolving the hand-wheel shown above, and which runs as a nut on the screw $f^5$, the spindle is either raised or depressed, and by this means the size of the hole drilled is determined.

The cutting-tool may be so situated relatively to the spindle that it will act upon external surfaces—such, for example, as upon nuts, bolts, heads, and the like. This is illustrated in Fig. 8.

Fig. 9 shows ordinary gear for reciprocating the head while slow rotary movement is given to the tool.

Fig. 10 is an illustration of the sleeve F, provided with a bearing-surface or tracer $f^5$, having a smaller end to enter the recess of the templet.

Figure 11:
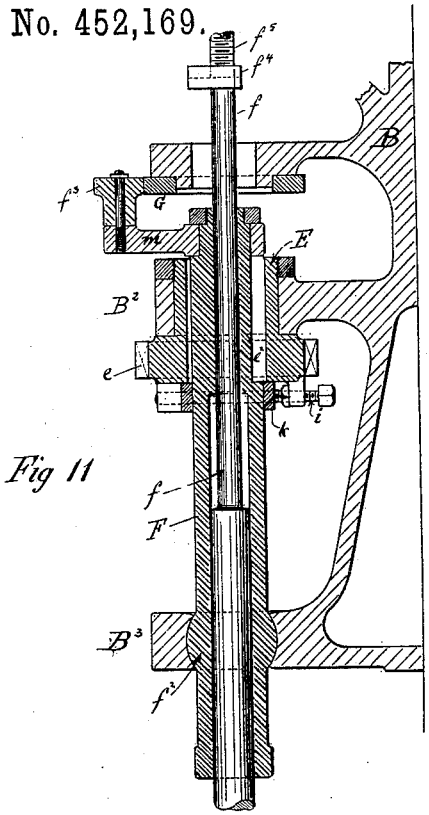
Figure 12:
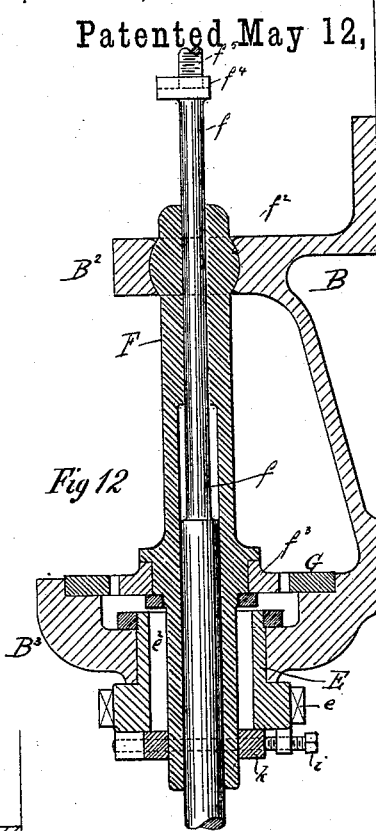
Figure 13:
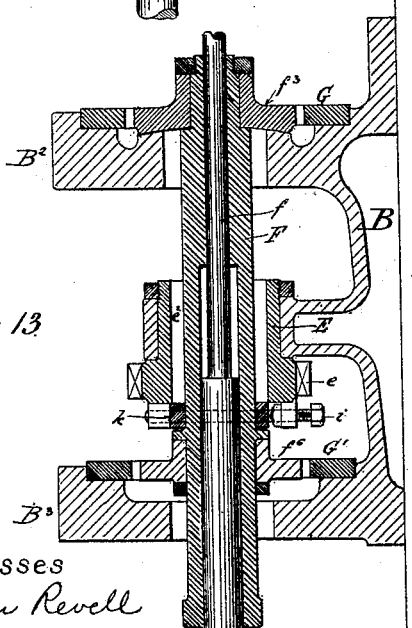
Figure 14:
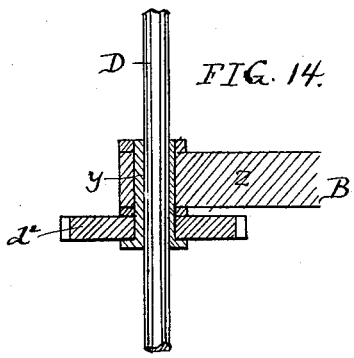

The mechanism described may be varied in its details. For instance, the roller $f^3$ may move outside the templet G, as shown in Fig. 11. The templet G may be rotated at intervals by hand, so as to vary the shape of the hole or surface, and similarly, if the spindle $f$ be moved in its sleeve during the operation, the hole or surface will be coned. The vibratory or conic motion of the tool-carrier may be obtained as described or in any other suitable way—as for instance, by moving it about a center above the templet, as shown in Fig. 12; or the spherical seating may be entirely omitted and the spindle guided by two templets G and G', as shown in Fig. 13. Here the spindle-sleeve F is provided with two rollers $f^3$ and $f^6$, each running on separate templets G and G'. The two templets are similar in shape but one is smaller than the other.

The tool is arranged as shown in Fig. 8, so that its cutting-edge is on the axial line of the drill-spindle to produce sharp corners in the work executed.

We claim as our invention—

1. In a machine for boring, drilling, or shaping, the combination of a frame and a head-stock with a tool-carrying spindle carried by the head-stock, means for rotating and oscillating the spindle, a templet to determine the oscillating movement, and means for adjusting the head-stock with the spindle while the latter is rotating.

2. In a machine for boring, drilling, or shaping, the combination of a tool-carrying spindle with a carrier therefor, the said spindle being capable of longitudinal adjustment in the carrier, a spherical bearing for the carrier, whereby the carrier and tool-carrying spindle may be oscillated, means for rotating the spindle, and a guiding-templet for the oscillating carrier.

3. In a machine for boring, drilling, or shaping, the combination of a frame and a head-stock adjustable on the frame with a tool-carrying spindle carried by the head-stock in a spherical bearing, so as to be free to oscillate therein, means for rotating the spindle, and a templet to determine the oscillating movement of the spindle.

4. In a machine for boring, drilling, or shaping, the combination of a head-stock having a spherical bearing, a spindle-carrier mounted in said bearing, and means for rotating the carrier with a tool-carrying spindle in the carrier, so as to rotate and oscillate therewith, but capable of longitudinal adjustment therein, a templet to determine the oscillating movement, and springs to keep part of the carrier up to the templet.

5. In a machine for boring, drilling, or shaping, the combination of a tool-carrying spindle oscillating in a spherical bearing with mechanism for rotating the spindle, a templet to determine the oscillating movement, and a cutting-tool carried by the spindle and having its cutting-edge in axial line with the spindle.

In testimony whereof we have signed our names to this specification in the presence of two subscribing witnesses.

ALFRED HUGH TYLER.
JOHN STUART ELLIS DE VESIAN.

Witnesses:
WILLIAM F. UPTON,
47 *Lincoln's Inn Fields, London, W. C.*
R. CALLON,
9 *Birchin Lane, London, E. C.*